(12) United States Patent
Khudyakov et al.

(10) Patent No.: US 6,859,600 B2
(45) Date of Patent: Feb. 22, 2005

(54) COATED OPTICAL FIBER AND OPTICAL FIBER RIBBON AND METHOD FOR THE FABRICATION THEREOF

(75) Inventors: Igor V. Khudyakov, Hickory, NC (US); Nicholas V. Nechitailo, Conover, NC (US)

(73) Assignee: Alcatel, Paris (FR)

( * ) Notice: Subject to any disclaimer, the term of this patent is extended or adjusted under 35 U.S.C. 154(b) by 165 days.

(21) Appl. No.: 10/157,064

(22) Filed: May 30, 2002

(65) Prior Publication Data

US 2003/0223718 A1 Dec. 4, 2003

(51) Int. Cl.[7] .............................. G02B 6/02; G02B 6/22
(52) U.S. Cl. ..................... 385/128; 385/114; 65/385; 65/430; 65/443; 65/529; 427/163.1; 427/163.2
(58) Field of Search ................................. 385/114, 128; 65/385, 430, 443, 529; 427/163.1, 163.2

(56) References Cited

U.S. PATENT DOCUMENTS

| | | | |
|---|---|---|---|
| 4,900,126 A | 2/1990 | Jackson et al. | 385/114 |
| 5,147,433 A | 9/1992 | Petisce | 65/3.11 |
| 5,416,880 A * | 5/1995 | Edwards et al. | 385/128 |
| 5,457,762 A | 10/1995 | Lochkovic et al. | 385/114 |
| 5,524,164 A * | 6/1996 | Hattori et al. | 385/114 |
| 5,561,730 A | 10/1996 | Lochkovic et al. | 385/114 |
| 6,018,605 A | 1/2000 | Mills et al. | 385/114 |
| 6,026,207 A * | 2/2000 | Reddy et al. | 385/128 |
| 6,122,428 A | 9/2000 | Duecker | 385/115 |
| 6,173,102 B1 | 1/2001 | Suzuki et al. | 385/128 |
| 6,181,859 B1 | 1/2001 | Suzuki et al. | 385/128 |
| 6,222,969 B1 * | 4/2001 | Botelho et al. | 385/114 |
| 6,253,013 B1 | 6/2001 | Lochkovic et al. | 385/114 |
| 6,254,808 B1 | 7/2001 | Blyler, Jr. et al. | 264/1.29 |
| 6,321,013 B1 | 11/2001 | Hardwick, III et al. | 385/114 |
| 6,577,802 B1 * | 6/2003 | Chien | 385/128 |
| 6,649,215 B2 * | 11/2003 | Harper et al. | 427/163.2 |
| 2003/0152350 A1 * | 8/2003 | Konda et al. | 385/128 |

FOREIGN PATENT DOCUMENTS

| | | | | |
|---|---|---|---|---|
| JP | 03004965 A | * | 1/1991 | B05D/1/18 |
| WO | WO 96/31444 | | 10/1996 | |

* cited by examiner

*Primary Examiner*—Brian Healy
*Assistant Examiner*—Daniel Petkovsek
(74) *Attorney, Agent, or Firm*—Sughrue Mion, PLLC (57) ABSTRACT

A coated optical fiber includes a fiber coating having an unblended primary portion on the optical fiber, an unblended secondary portion, and a blended portion intermediate the unblended primary and secondary portions. The thickness of the blended portion is greater than or equal to about 10% but less than 100% of the thickness of the fiber coating. An optical fiber ribbon includes a ribbon matrix similarly having an unblended primary portion, an unblended secondary portion, and a blended portion between the unblended primary portion and unblended secondary portion. A method for fabricating a coated optical fiber or optical fiber ribbon includes applying a primary portion material to the optical fiber or plurality of coated optical fibers, and applying a secondary portion material in a manner selected to provide a blend of the primary portion material and the secondary portion material. An applicator apparatus includes means for performing the described steps.

12 Claims, 7 Drawing Sheets

COATED OPTICAL FIBER AND OPTICAL FIBER RIBBON AND METHOD FOR THE FABRICATION THEREOF

BACKGROUND OF THE INVENTION

1. Field of the Invention

The present invention generally relates to the field of optical fibers, and in particular coated optical fibers and optical fiber ribbons and methods for the fabrication thereof.

2. Discussion of Related Art

Figure 1:
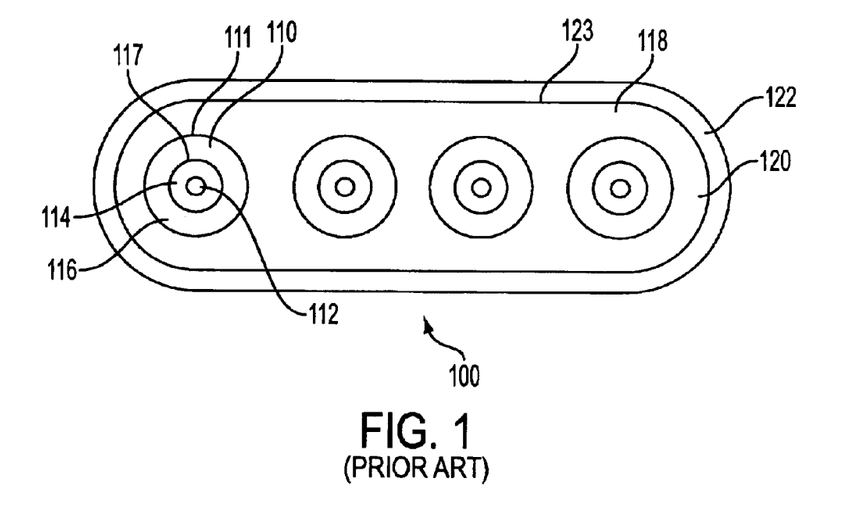
FIG. 1 is a cross-sectional view of a prior art optical fiber ribbon.

FIG. 1 depicts a prior art optical fiber ribbon 100, which includes a plurality of prior art coated optical fibers 110 and a matrix 118, which surrounds coated optical fibers 110.

Optical fiber ribbon 100 is generally useful for transmitting information. Each of coated optical fibers 110 includes an optical fiber 112, which can be made from glass or other optically transmitting material. Optical fiber 110 further includes a prior art fiber coating 111, which consists of a primary coating 114 formed on optical fiber 112 and a secondary coating 116 formed on primary coating 114.

Primary coating 114 is typically formulated to allow ease of removal from optical fiber 112. Secondary coating 116 is typically a layer distinct from primary coating 114 and is designed to provide properties, such as hardness that is greater than that of primary coating 114.

It is known in the art to deposit primary and secondary coatings 114 and 116 as separate, distinct layers. As a consequence, a thin interpenetration layer 117 can form at the interface between primary and secondary coatings 114 and 116. Interpenetration bonding layer 117 has a thickness that is much less than the overall thickness of fiber coating 111 and can be on the order of microns. Thin interpenetration layer 117 tends to deteriorate, and this deterioration can result in the separation of secondary coating 116 from primary coating 114.

It is also known in the art that matrix 118 should preferably allow ease of separation from coated optical fibers 110, while providing mechanical protection and reduced friction at its outer surfaces. For example, as further illustrated by FIG. 1, matrix 118 can be made from a primary matrix layer 120 and a secondary matrix layer 122. A thin interpenetration layer 123 exists between primary and secondary matrix layers 120 and 122, and can deteriorate to cause the undesireable separation of layers 120 and 122, similar to the separation described with reference to primary and secondary coatings 114 and 116 of coated optical fiber 110.

Figure 2:
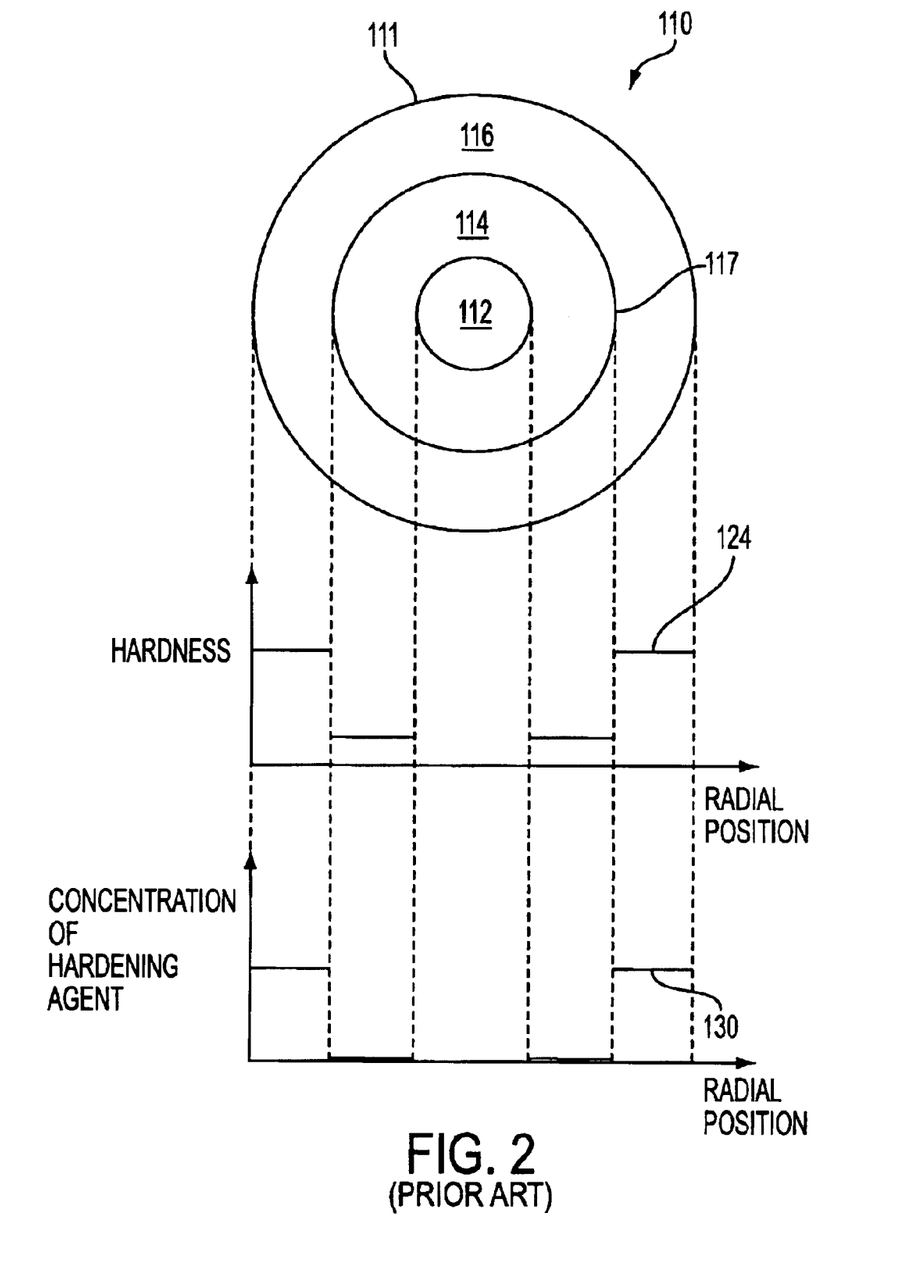
FIG. 2 is a cross-sectional view of a prior art coated optical fiber and includes graphical representations of the hardness and concentration of a hardening agent prior to curing for the primary and secondary coatings thereof.

FIG. 2 is a cross-sectional view of prior art coated optical fiber 110 and includes graphical representations of the hardness and concentration of a hardening agent just prior to curing for prior art fiber coating 111. The hardening agent is a constituent added to make secondary coating 116 harder than primary coating 114. The concentration depicted is that just prior to curing since primary and secondary coatings are made from UV-curable formulations of oligomers and liquid monomers (with reactive usually acrylate functional groups), and photoinitiators. The photoinitiator absorbs energy radiated by a UV light source, fragmenting into reactive species, and then initiating a polymerization/hardening reaction of the monomer and oligomers. The result is a solid network of crosslinking between the monomers, oligomers, and other additives. Thus, individual constituents, such as hardening agents, are generally transformed during the curing step.

A graph 124 of hardness illustrates that the hardness of prior art fiber coating 111 changes sharply as a step-function at interpenetration layer 117 due to the fact that primary and secondary coatings 114 and 116 are applied as separate, distinct layers having distinct hardness properties. Specifically, the hardness of secondary coating 116 is generally uniform throughout and is greater than that of primary coating 114.

A graph 130 of concentration of a hardening agent illustrates that the concentration of a hardening agent just prior to curing also changes sharply as a step-function at interpenetration layer 117 due to the fact that primary and secondary coatings 114 and 116 are applied as separate, distinct layers having distinct compositions and that primary coating 114 is typically cured prior to the curing of secondary coating 116.

In view of the above, there exists a need for an improved coated optical fiber and an improved optical fiber ribbon that provide interior peelability and reduced exterior friction while reducing or eliminating the problem of layer separation at interpenetration layers.

SUMMARY OF THE INVENTION

The foregoing shortcomings of the prior art are overcome by a coated optical fiber, an optical fiber ribbon, an applicator apparatus, and a method for fabricating a coated optical fiber and optical fiber ribbon in accordance with the present invention. The coated optical fiber and optical fiber ribbon of the invention include a fiber coating and/or a ribbon matrix that has an interior unblended primary portion, an exterior unblended secondary portion, and a blended portion intermediate the unblended primary and secondary portions. Preferably, the thickness of the blended portion is greater than or equal to about 10% but less than 100% of the thickness of the overall thickness of the fiber coating or ribbon matrix. More preferably, the thickness of the blended portion is within a range of 10–20% of the overall thickness of the fiber coating or ribbon matrix.

The blended portion is a blend of the materials of the primary and secondary portions. The blended portion provides the benefit of maintaining the interconnection of the unblended primary and secondary coatings. The coated optical fiber and optical fiber ribbon of the invention do not have the thin interpenetration layers of the prior art and, therefore, do not exhibit the problems of deterioration and layer separation associated with these thin interpenetration layers.

The applicator apparatus and the method of the invention allow the formation of these improved coated optical fibers and an optical fiber ribbons. The formation of these improved structures includes the steps of applying a primary portion material to an optical fiber or a plurality of coated optical fibers and applying to the coated structure a secondary portion material in a manner selected to provide a blend of the primary portion material and the secondary portion material. Preferably, the primary portion material is applied at a pressure greater than atmospheric pressure, the secondary portion material is applied at a pressure equal to or about equal to the pressure of the primary portion material, and the secondary portion material is applied at an angle that is within a range of about 30 to 60 degrees with respect to the axis of the optical fiber or with respect to a plane defined by a plurality of coated optical fibers. Also preferably, the secondary portion material is applied prior to any curing of the primary portion material.

BRIEF DESCRIPTION OF THE DRAWINGS

The advantages, nature and various additional features of the invention will appear more fully upon consideration of the illustrative embodiments of the invention which are schematically set forth in the drawings, in which.

DETAILED DESCRIPTION OF THE INVENTION

The present invention will be explained in further detail by making reference to the accompanying drawings, which do not limit the scope of the invention in any way.

Figure 3:
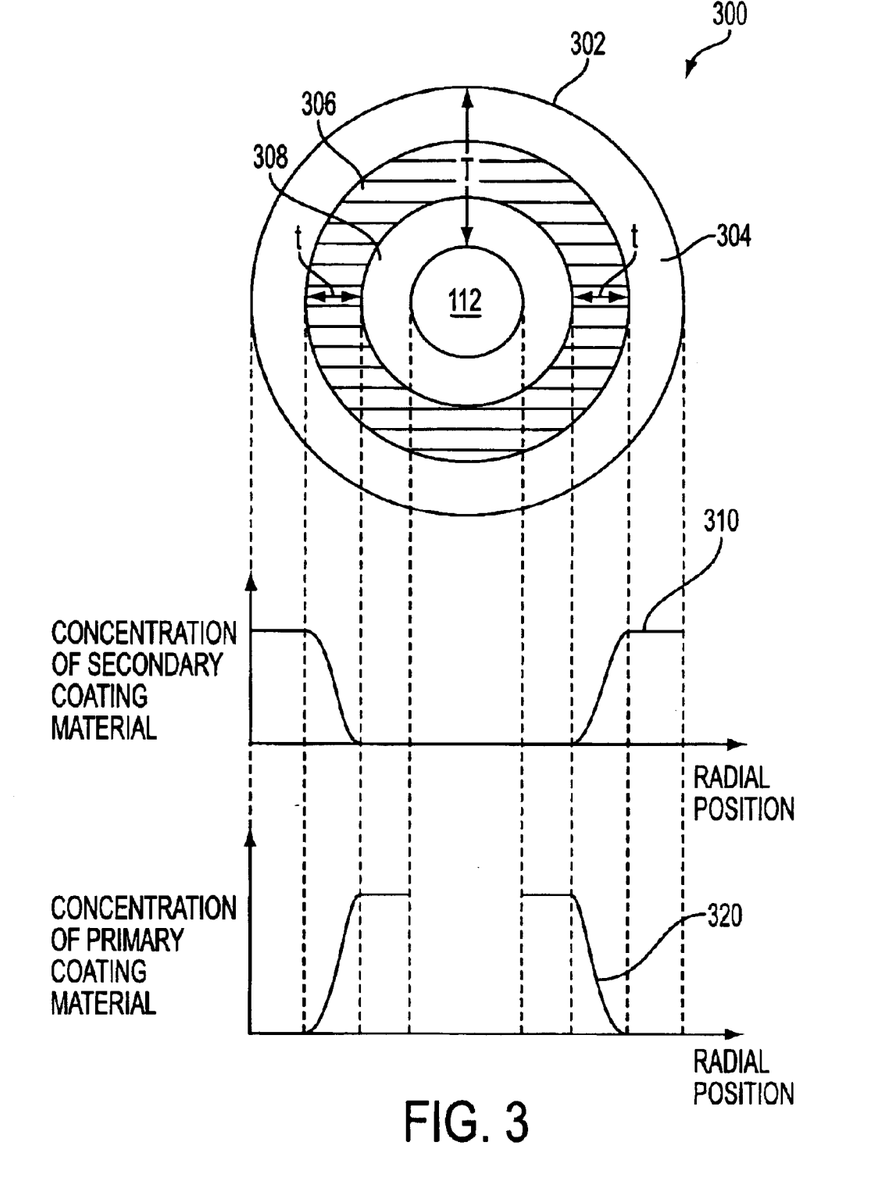
FIG. 3 is a cross-sectional view of a coated optical fiber and includes graphical representations of the concentrations of the primary and secondary coating materials just prior to curing, in accordance with a first embodiment of the invention.

Turning to FIG. 3, it depicts a cross-sectional view of a coated optical fiber 300 and includes a graphical representation 310 of the concentration of the secondary coating material and a graphical representation 320 of the concentration of the primary coating material just prior to curing, in accordance with a first embodiment of the invention.

Coated optical fiber 300 includes optical fiber 112 and a fiber coating 302, which is formed on optical fiber 112. In accordance with the invention, fiber coating 302 includes an unblended primary portion 308, an unblended secondary portion 304, and a blended portion 306. Unblended primary portion 308 is disposed on optical fiber 112 and is made from a first material. Unblended secondary portion 304 defines an external surface of fiber coating 302 and is made from a second material. Blended portion 306 is disposed intermediate unblended primary portion 308 and unblended secondary portion 304. Blended portion 306 is made from a blend of the first and second materials from which unblended primary and secondary portions 308 and 304 are made. In general, the first and second materials are different.

In the embodiment of FIG. 3, the first material from which unblended primary portion 308 is made includes a conventional UV-curable primary coating material for a coated optical fiber. Thus, the first material includes a UV-curable formulation of oligomers, liquid monomers (with reactive, usually acrylate, functional groups) and photoinitiators. The first material includes a release agent for facilitating removal of fiber coating 302 from optical fiber 112 to improve peelability. The release agent can be a UV-curable epoxy silicone, manufactured by GE Silicones of Waterford, N.Y.

In the embodiment of FIG. 3, the second material from which unblended secondary portion 304 is made includes a conventional UV-curable secondary coating material for a coated optical fiber. Thus, the second material includes a UV-curable formulation of liquid monomers, oligomer "backbones" (with e.g. acrylate functional groups), and photoinitiator additives. The second material includes a hardening agent for enhancing the modulus and stiffness, and reducing the friction of unblended secondary portion 304. Preferably, and in accordance with the embodiment of FIG. 3, the hardness of the unblended primary portion is less than the hardness of the unblended secondary portion.

As illustrated in graph 310 of FIG. 3, the concentration of the secondary coating material is highest at the location of unblended secondary portion 304 and lowest at the location of unblended primary portion 308, and decreases radially inward at the location of blended portion 306. As illustrated in graph 320 of FIG. 3, the concentration of the primary coating material is highest at the location of unblended primary portion 308 and lowest at the location of unblended secondary portion 304, and increases radially inward at the location of blended portion 306.

Fiber coating 302 has a thickness, T, and blended portion 306 has a thickness, t. Preferably, and in accordance with the invention, the thickness, t, of blended portion 306 is greater than or equal to about 10% but less than 100% of the thickness, T, of fiber coating 302. For example, the thickness of blended portion 306 can be greater than or equal to 10%, but less than 100% of the thickness of fiber coating 302. More preferably, the thickness of blended portion 306 is within a range of 10–20% of the thickness of fiber coating 302. The thickness of blended portion 306 can be nearly 100% of the thickness of fiber coating 302, such that only the outermost surfaces are made from the unblended materials. By providing a relatively wide interpenetration layer, undesirable layer separation is advantageously prevented.

It is desired to be understood that although the thickness, t, of blended portion 306 is depicted in the figures as uniform, it may not be uniform, and the thickness relevant for the purposes of this description is the average thickness of blended portion 306.

Figure 4:
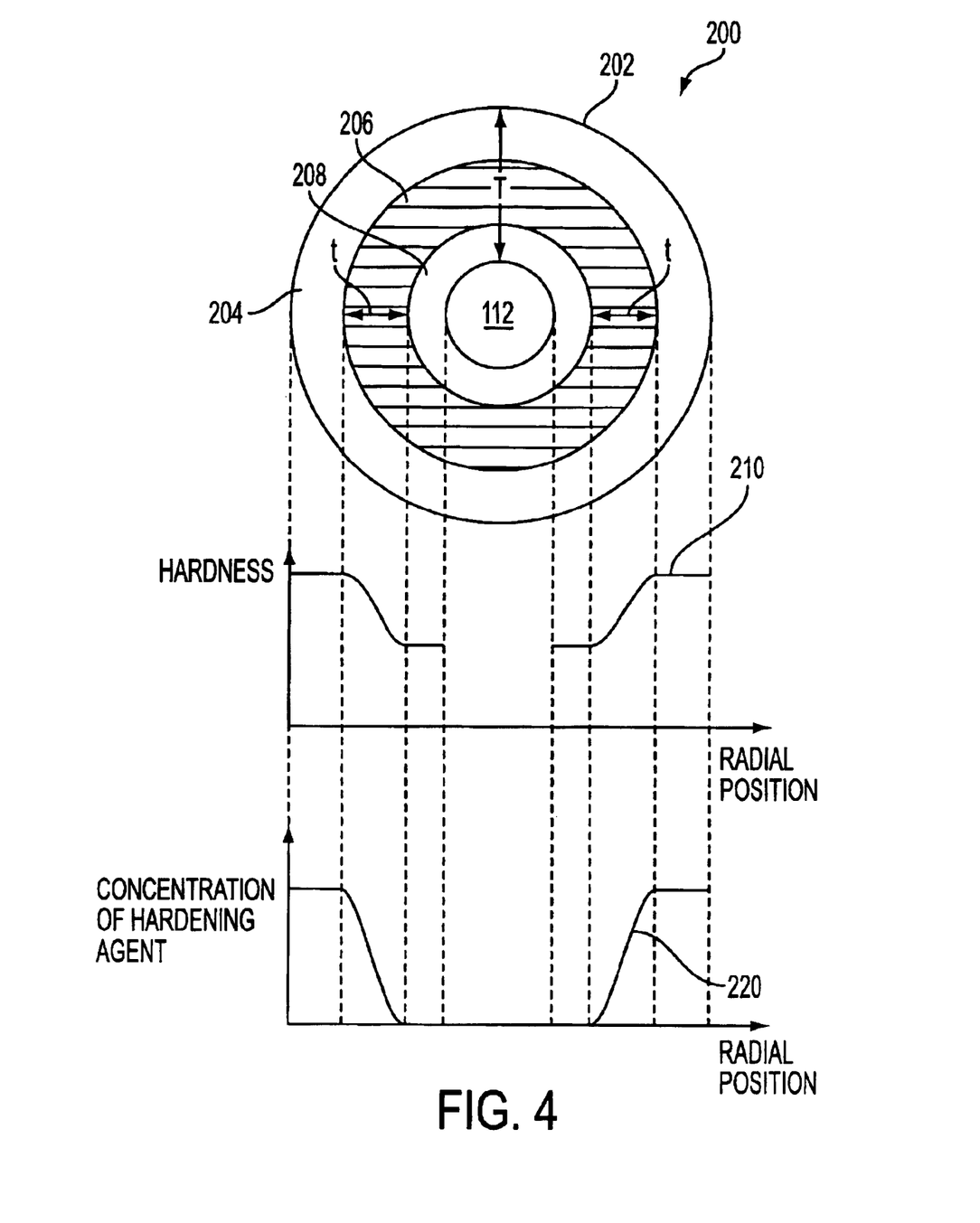
FIG. 4 is a cross-sectional view of a coated optical fiber and includes graphical representations of hardness and concentration of a hardening agent just prior to curing for the unblended primary and secondary portions and the blended portion, in accordance with a second embodiment of the invention.

FIG. 4 is a cross-sectional view of a coated optical fiber 200 and includes a graphical representation 210 of hardness and a graphical representation 220 of concentration of a hardening agent just prior to curing. Coated optical fiber 200 has a fiber coating 202, which includes an unblended primary portion 208, an unblended secondary portion 204, and a blended portion 206, in accordance with a second embodiment of the invention.

In the embodiment of FIG. 4, a secondary portion material, from which unblended secondary portion 204 is made, comprises a UV-curable formulation having for a hardening agent 10–60 weight % of a multifunctional acrylate (MFA). Preferably, the MFA is selected from the group consisting of tris(2-hydroxyethyl)isocyanurate triacrylate, 1,6-hexanediol diacrylate, 1,1,1-trimethylolpropane triacrylate, 1,1,1',1'-tetramethyloldipropyl ether tetraacrylate, and dipentaerythritol pentacrylate. The MFA can also be a hexafunctional urethane acrylate or a polyester-based urethane hexaacrylate oligomer. Such di-hexa functional commercial acrylates can be obtained from Sartomer of Exton, Pa. Alternatively, the MFA can be a hexafunctional aliphatic urethane acrylate oligomer, which is available from UCB Radcure of Smyrna, Ga. (e.g., product number Ebecryl 8301 or Ebecryl 1290) or from other suppliers.

Alternatively, and also in accordance with a preferred embodiment of the invention, the secondary portion material, from which unblended secondary portion 204 is made, comprises a UV-curable formulation having for a hardening agent 10–60 weight % of a functionalized colloidal silica. A functionalized colloidal silica (FCS) is a product of the hydrolysis of colloidal silica with [(methacryloxy)propyl]trimethoxysilane in a matrix of 1,6-hexanediol diacrylate. Such a hardening agent is available from GE Silicones of Waterford, N.Y. (e.g., product number FCS100).

As illustrated in graph 210 of FIG. 4, the hardness of fiber coating 202 is highest at unblended secondary portion 204, lowest at unblended primary portion 208, and decreases radially inward over blended portion 206. As illustrated in graph 220 of FIG. 4, the concentration of the hardening agent (MFA or FCS) prior to curing is highest at the location of unblended secondary portion 204, lowest at the location of unblended primary portion 208, and decreases radially inward at the location of blended portion 206. It is desired to be understood that although the hardness and concentration profiles at blended portion 206 are depicted as being generally gradually-changing and S-shaped, further embodiments of the invention can exhibit other profiles.

Figure 5:
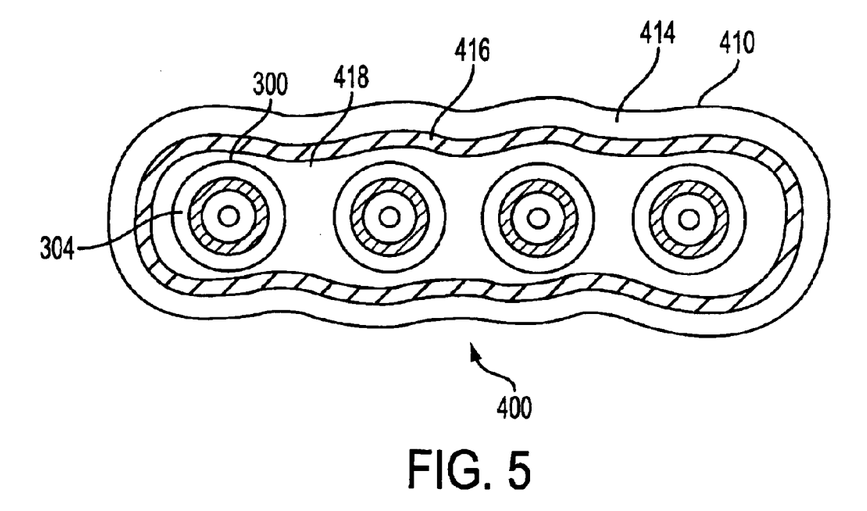
FIG. 5 is a cross-sectional view of an optical fiber ribbon in accordance with a further embodiment of the invention.

FIG. 5 is a cross-sectional view of an optical fiber ribbon 400 in accordance with a further embodiment of the invention. Optical fiber ribbon 400 includes a plurality of coated optical fibers 300, which were described with reference to FIG. 3, and a ribbon matrix 410, which surrounds coated optical fibers 300. Ribbon matrix 410 has an unblended primary portion 418 made from a first material, an unblended secondary portion 414 made from a second material, and a blended portion 416 disposed intermediate unblended primary portion 418 and unblended secondary portion 414. Blended portion 416 is defined by a blend of the first and second materials, which are different from one another. In accordance with the invention, the characteristics of unblended primary portion 418, unblended secondary portion 414, and blended portion 416 are as described with reference to the unblended primary and secondary portions and the blended portions, respectively, of either of the embodiments of FIGS. 3 and 4. Thus, preferably, the hardness of unblended primary portion 418 is less than the hardness of unblended secondary portion 414. Further, preferably, the thickness of blended portion 416 is greater than or equal to about 10% but less than 100% of the thickness of ribbon matrix 410. For example, the thickness of blended portion 416 is greater than or equal to 10%, but less than 100% of the thickness of ribbon matrix 410. More preferably, the thickness of blended portion 416 is within a range of 10–20% of the thickness of ribbon matrix 410.

The composition of the first material from which unblended primary portion 418 is made can be similar to or the same as the composition of the material from which unblended secondary portion 304 of coated optical fiber 300 is made, and the second material from which unblended secondary portion 414 is made can be a combination of this first material and a hardening agent, such as MFA or FCS. For example, a composition useful for the first material is: from about 35 to about 98 wt % of an aliphatic polyether-based urethane acrylate, from about 0.5 to about 35 wt % of a monomer having a plurality of acrylate or methacrylate moieties per monomer molecule, from about 0.5 to about 20 wt % of a monoacrylate or monomethacrylate monomer having an alkyl moiety of 7–18 carbon atoms, and from about 0 to about 10 wt % of a photoinitiator. The first material can be a commercially available matrix material, and the second material can be a combination of a hardening agent, such as MFA or FCS, and the commercially available matrix material.

Figure 6:
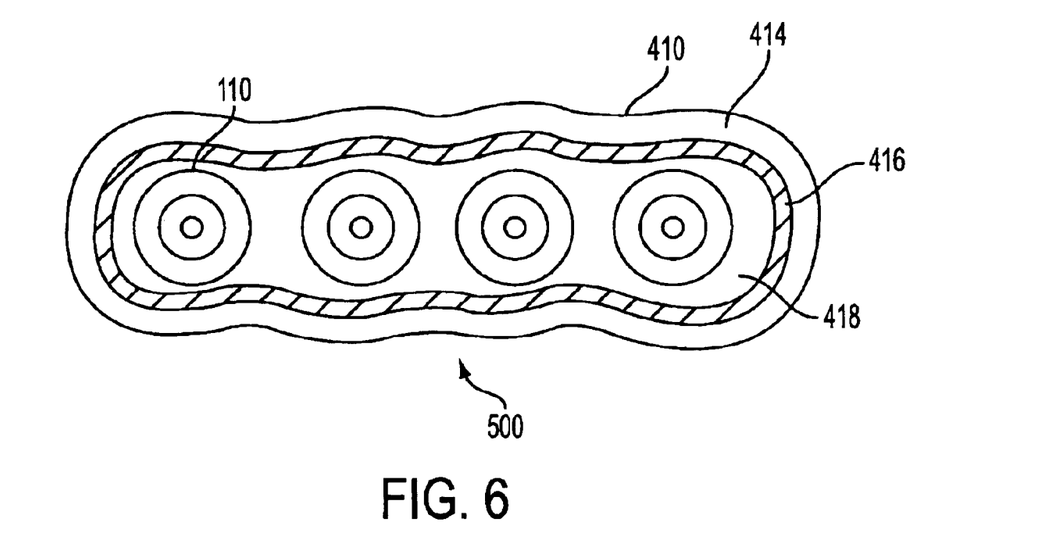
FIG. 6 is a cross-sectional view of an optical fiber ribbon in accordance with yet a further embodiment of the invention.

FIG. 6 is a cross-sectional view of an optical fiber ribbon 500 in accordance with yet a further embodiment of the invention. In the embodiment of FIG. 6, ribbon matrix 410 is formed on a plurality of prior art coated optical fibers 110. Unblended secondary portion 414, blended portion 416, and unblended primary portion 418 are as described with reference to FIG. 5.

Figure 7:
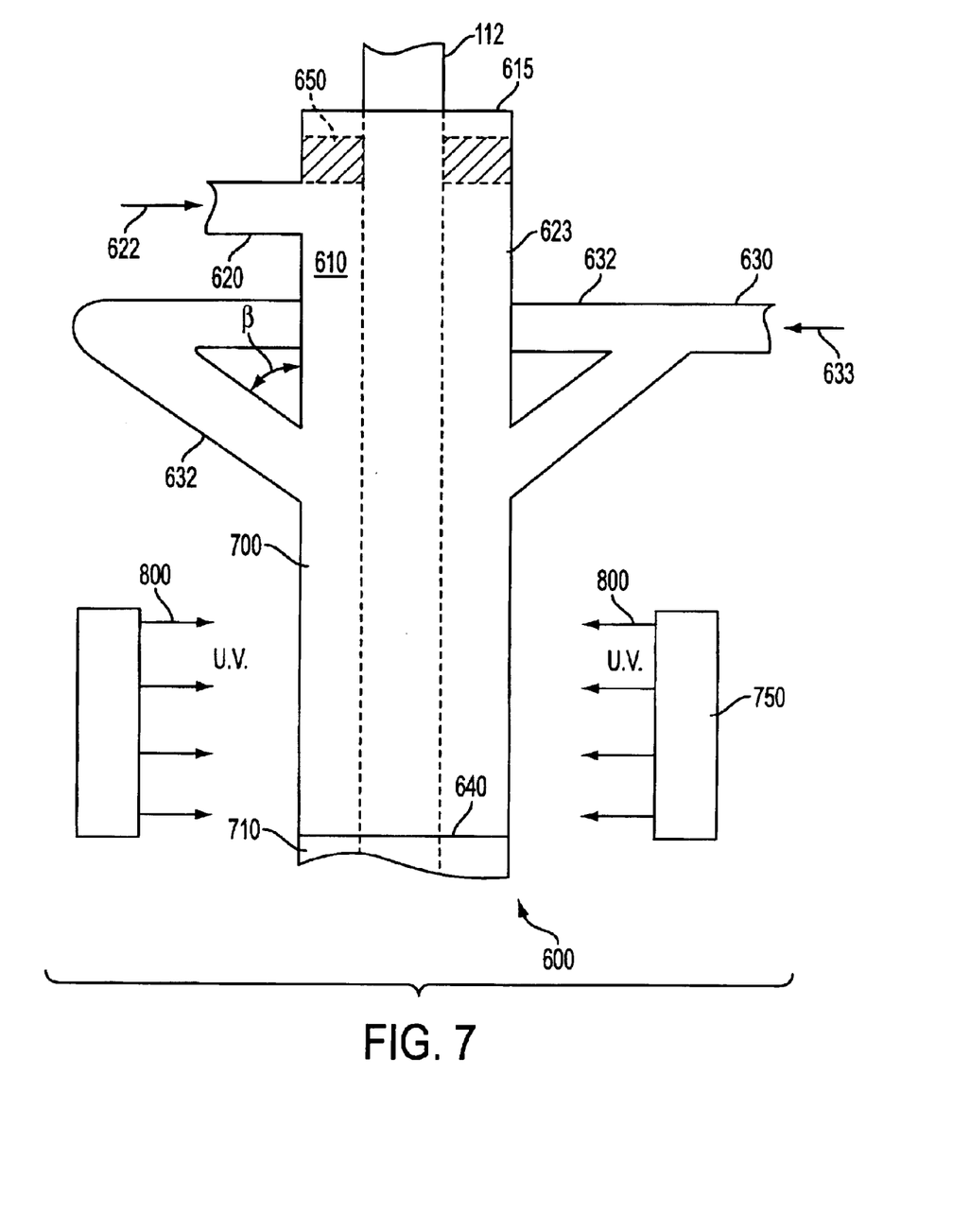
FIG. 7 is a side view of an applicator apparatus for applying a fiber coating or ribbon matrix in accordance with the invention.

FIG. 7 is a side view of an applicator apparatus for applying a fiber coating or ribbon matrix in accordance with the invention. First, a method for fabricating a coated optical fiber or optical fiber ribbon in accordance with the invention will be described with reference to FIG. 7. FIG. 7 is directed to the method for fabricating a coated optical fiber. However, the process is identical for the method for fabricating an optical fiber ribbon, with the exception that the geometry of the applicator apparatus is adapted to the geometry of the plurality of coated optical fibers on which the ribbon matrix is formed.

The method in accordance with the invention generally includes the steps of providing optical fiber 112 or a plurality of coated optical fibers; applying a primary portion material to optical fiber 112 or the plurality of coated optical fibers, thereby providing a first coated structure, such as first coated structure 623; and applying to the first coated structure a secondary portion material in a manner selected to provide a blend of the primary portion material and the secondary portion material.

Preferably, the method of the invention includes the step of blending the primary portion material and the secondary portion material to an extent sufficient to prevent separation of an unblended primary portion from an unblended secondary portion of the fiber coating or the ribbon matrix.

Also preferably, the method of the invention includes the step of blending the primary portion material and the secondary portion material to an extent sufficient for the blend to define a blended portion having a thickness that is greater than or equal to about 10% and less than 100% (e.g., greater than or equal to 10% and less than 100%) of the combined thicknesses of the unblended primary portion, the unblended secondary portion, and the blended portion.

As illustrated in FIG. 7, applicator apparatus 600 includes a die structure having a main body 610, a fiber inlet 615 for the introduction of optical fiber 112, and a first feed inlet 620 for the introduction of a feed 622 of the primary portion material. Applicator apparatus 600 further includes a second feed inlet 630 for the introduction of a feed 633 of a secondary portion material. Second feed inlet 630 also includes a funneling arm 632, which forms an angle, β, with the axis of main body 610. Applicator apparatus 600 also has a UV curing lamp 750.

In accordance with a preferred method of the invention, the secondary portion material is applied at an angle that is within a range of about 30 to 60 degrees (e.g., a range of 30 to 60 degrees) with respect to the axis of the optical fiber or with respect to a plane defined by the plurality of coated optical fibers. Thus, the angle β of FIG. 7 is preferably selected to be within a range of about 30 to 60 degrees.

Also preferably, the primary portion material is applied at a pressure greater than atmospheric pressure. Thus, in the method of FIG. 7, first feed inlet 620 is located below a column 650 of primary portion material for exerting hydrostatic pressure. In an alternative method in accordance with the invention, a sealant, such as a layer of a liquid metal (e.g., mercury or gallium) can be used to seal the top of the die.

Preferably, the secondary portion material is applied at a pressure equal to or about equal to the pressure of the primary portion material. Also preferably, the secondary portion material is applied prior to the performance of a curing step. In the method of FIG. 7, the curing of an uncured coating 700 is performed subsequent to the step of applying the secondary portion material. The curing is caused by UV rays 800, which are applied through main body 610, so that a cured coating 710 exists at outlet 640. Having a cured coating at the outlet provides a way of sealing the outlet and allows the pressure inside the applicator apparatus to exceed atmospheric pressure. After curing, the coated optical fiber is sent to a capstan.

By allowing one-step curing, rather than requiring two separate curing chambers, the method of the invention permits a decrease in the height of a draw tower and reduces manufacturing costs.

Furthermore, the method and applicator apparatus of the invention allow the overall thickness of the applied coatings to be 1.5 to 2 times less than the overall thickness of prior art coatings having two distinct layers. This feature of the invention provides the advantage of a reduced coating volume, thereby further reducing production costs and the height of a draw tower.

Generally, the pressure and viscosity of each of the primary and secondary portion materials, the draw speed, and the angle β are selected to realize laminar flow and the desired characteristics of the blended portion. Preferably, the viscosity of the primary portion material and the viscosity of the secondary portion material are each within a range of about $10^1$ to about $10^2$ centipoise at the temperature of application. Also preferably, the viscosity of the primary portion material is about equal to a viscosity of the secondary portion material.

Preferably, the primary portion material and the secondary portion material each comprise about 0.01 weight % wetting agents. The wetting agents can include, for example, a flow control additive, a slipping agent, and the like.

It is of course understood that departures can be made from the preferred embodiments of the invention by those of ordinary skill in the art without departing from the spirit and scope of the invention that is limited only by the following claims.

We claim:

1. A coated optical fiber comprising:

an optical fiber; and a fiber coating disposed on the optical fiber, wherein the fiber coating has an unblended primary portion disposed on the optical fiber and made from a first material, an unblended secondary portion defining an external surface of the fiber coating and made from a second material, and a blended portion disposed intermediate the unblended primary portion and unblended secondary portion and defined by a blend of the first and second materials, wherein the fiber coating has a thickness, the blended portion has a thickness, and the thickness of the blended portion is greater than or equal to about 10% but less than 100% of the thickness of the fiber coating, and wherein the first and second materials are different.

2. The coated optical fiber as claimed in claim 1, wherein the unblended primary portion and the unblended secondary portion each has a hardness, and wherein the hardness of the unblended primary portion is less than the hardness of the unblended secondary portion.

3. The coated optical fiber as claimed in claim 1, wherein the second material comprises a UV-curable formulation having 10–60 weight % of a multifunctional acrylate.

4. The coated optical fiber as claimed in claim 3, wherein the multifunctional acrylate is selected from the group consisting of tris(2-hydroxyethyl)isocyanurate triacrylate, hexanediol diacrylate, 1,1,1-trimethylolpropane triacrylate, 1,1,1',1'-tetramethyloldipropyl ether tetraacrylate, and dipentaerythritol pentacrylate.

5. The coated optical fiber as claimed in claim 1, wherein the second material comprises a UV-curable formulation having 10–60 weight % of a functionalized colloidal silica.

6. An optical fiber ribbon comprising a plurality of optical fibers having disposed thereon a ribbon matrix having an unblended primary portion made from a first material, an unblended secondary portion made from a second material, and a blended portion disposed intermediate the unblended primary portion and unblended secondary portion and defined by a blend of the first and second materials, wherein the first and second materials are different, and wherein the ribbon matrix has a thickness, the blended portion has a thickness, and the thickness of the blended portion is within a range of 10–20% of the thickness of the ribbon matrix.

7. The optical fiber ribbon as claimed in claim 6, further comprising a plurality of coated optical fibers, wherein the ribbon matrix is disposed on the plurality of coated optical fibers.

8. The optical fiber ribbon as claimed in claim 7, wherein each of the plurality of coated optical fibers comprises a coated optical fiber, wherein the coated optical fiber comprises an optical fiber, and a fiber coating disposed on the optical fiber, wherein the fiber coating has an unblended first portion disposed on the optical fiber and made from a first coating material, an unblended second portion defining an external surface of the fiber coating and made from a second coating material different from the first coating material, and a blended portion disposed intermediate the unblended first portion and unblended second portion and defined by a blend of the first and second coating materials.

9. The optical fiber ribbon as claimed in claim 6, wherein the unblended primary portion has a hardness that is less than the hardness of the unblended secondary portion.

10. The optical fiber ribbon as claimed in claim 6, wherein the second material comprises a UV-curable formulation having 10–60 weight % of a multifunctional acrylate.

11. The optical fiber ribbon as claimed in claim 10, wherein the multifunctional acrylate is selected from the group consisting of tris(2-hydroxyethyl)isocyanurate triacrylate, hexanediol diacrylate, 1,1,1-trimethylolpropane triacrylate, 1,1,1',1'-tetramethyloldipropyl ether tetraacrylate, and dipentaerythritol pentacrylate.

12. The optical fiber ribbon as claimed in claim 6, wherein the second material comprises a UV-curable formulation having 10–60 weight % of a functionalized colloidal silica.

* * * * *